United States Patent [19]

Sudoh et al.

[11] Patent Number: 4,765,685
[45] Date of Patent: Aug. 23, 1988

[54] CHILD SEAT ARRANGEMENT

[75] Inventors: Kunio Sudoh, Tokyo; Kohei Nogami, Narashino, both of Japan

[73] Assignees: Nippon Seiko Kabushiki Kaisha; Kokushin Sanhyo Kabushiki Kaisha, both of Tokyo, Japan

[21] Appl. No.: 943,441

[22] Filed: Dec. 18, 1986

[30] Foreign Application Priority Data

Dec. 20, 1985 [JP] Japan .................. 60-196230[U]

[51] Int. Cl.⁴ .................................. A47D 13/08
[52] U.S. Cl. .................................. 297/488; 297/250
[58] Field of Search .............. 297/488, 487, 216, 250

[56] References Cited

U.S. PATENT DOCUMENTS

| | | | |
|---|---|---|---|
| 3,957,303 | 5/1976 | Mauron | 297/488 X |
| 4,033,623 | 7/1977 | Thary et al. | 297/488 |
| 4,155,591 | 5/1979 | Mauron | 297/250 X |
| 4,342,483 | 8/1982 | Takada | 297/488 |
| 4,643,474 | 2/1987 | Wise | 297/488 X |
| 4,671,574 | 6/1987 | Kassai | 297/488 X |

FOREIGN PATENT DOCUMENTS 3850 9/1979 European Pat. Off. ............ 297/250

Primary Examiner—Peter A. Aschenbrenner
Attorney, Agent, or Firm—Bachman & LaPointe

[57] ABSTRACT

A child seat arrangement has a seat section detachably fixed to a vehicular seat of a vehicle. A protective support is placed essentially in front of a child sitting on the seat section. The protective support protects the child when the child is moved frontwards. A belt device releasably binds the protective support to the seat section.

7 Claims, 4 Drawing Sheets

CHILD SEAT ARRANGEMENT

BACKGROUND OF THE INVENTION 1. Field of the Invention

1. The invention relates generally to a child seat arrangement, and particularly to a vehicular child seat arrangement.

2. Description of the Prior Art

In automotive vehicles, auxiliary child seats of several types are conventionally used for child safety. The conventional auxiliary seats of one type include a restrictive member which surrounds a child sitting on a vehicle seat. The child is bound to the restrictive member by a belt. The restrictive member is fixed to the vehicle seat by an accessory seat belt.

In the conventional auxiliary child seats of another type, a restrictive member and a child are together bounded to a vehicle seat by an accessory seat belt.

In the conventional auxiliary seats of a further type, a restrictive member has a front protector. A child is held in the restrictive member by the front protector without using a belt. The restrictive member is fixed to a vehicle seat by an accessory seat belt.

SUMMARY OF THE INVENTION

It is an object of this invention to provide a more comfortable child seat arrangement than available heretofore.

It is another object of this invention to provide a safer child seat arrangement than available heretofore.

In accordance with this invention, a child seat arrangement has a seat section detachably fixed to a vehicular seat of a vehicle. A protective support is placed essentially in front of a child sitting on the seat section. The protective support protects the child when the child is moved frontwards. A belt device releasably binds the protective support to the seat section.

DESCRIPTION OF THE PREFERRED EMBODIMENT

Figure 1:
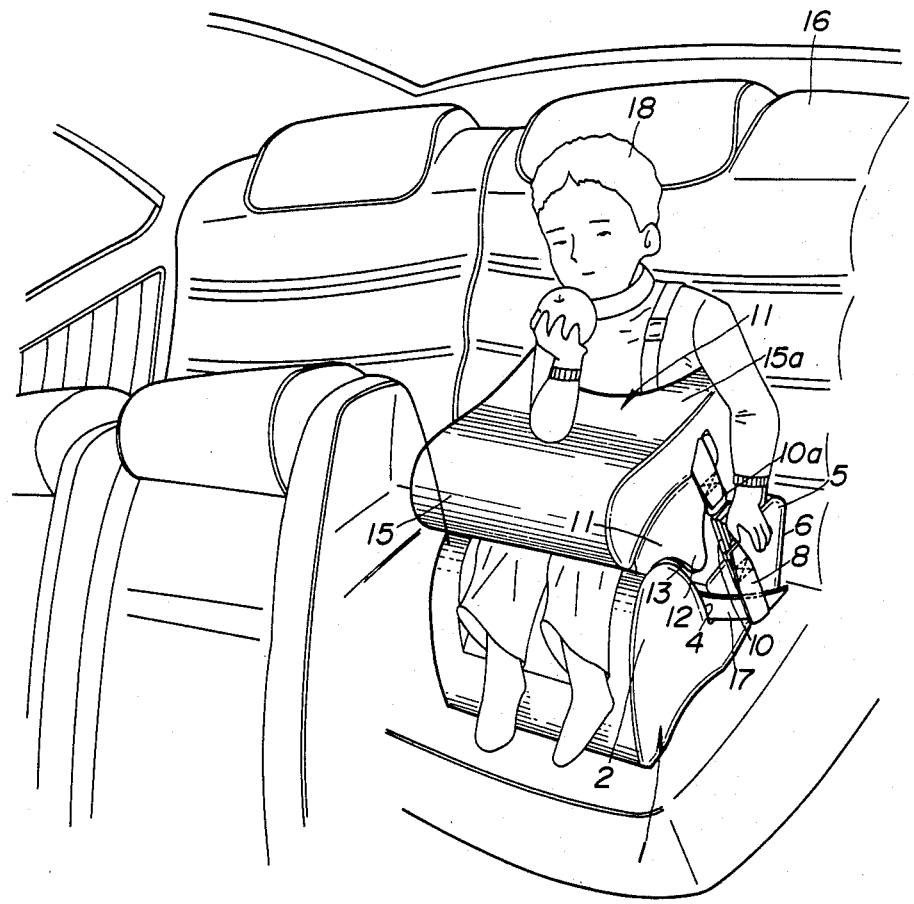
FIG. 1 is a perspective view of an interior of a vehicle, a chld, and a child seat arrangement according to an embodiment of this invention.
Figure 2:
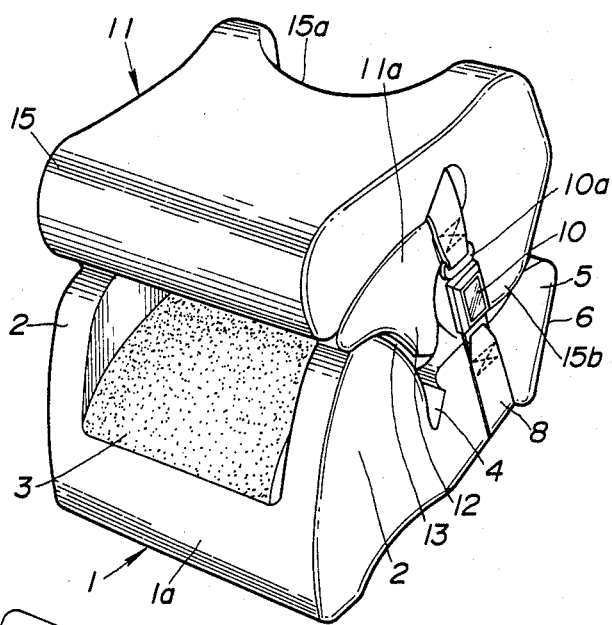
FIG. 2 is a perspective view of the child seat arrangement of FIG. 1.
Figure 3:
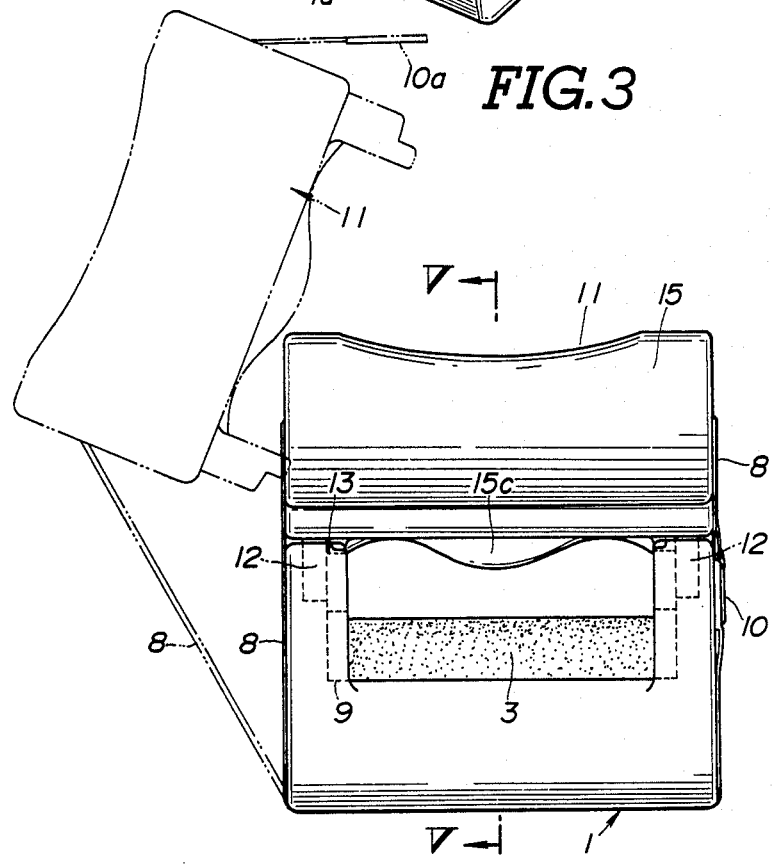
FIG. 3 is a front view of the child seat arrangement of FIG. 1.

With reference FIGS. 1–5, a child seat arrangement includes a seat section or seat cushion 1 and a protective support or protector 11. When the child seat arrangement is used, the seat section 1 is fixedly placed on a vehicular seat 16 and a child 18 sits on the seat section 1. The protective support 11 is bounded to the seat section 1. The proective support 11 extends generally in front of the child 18. The child 18 is restricted or held between the protective support 11 and a seat back of the vehicular seat 16.

Figure 5:
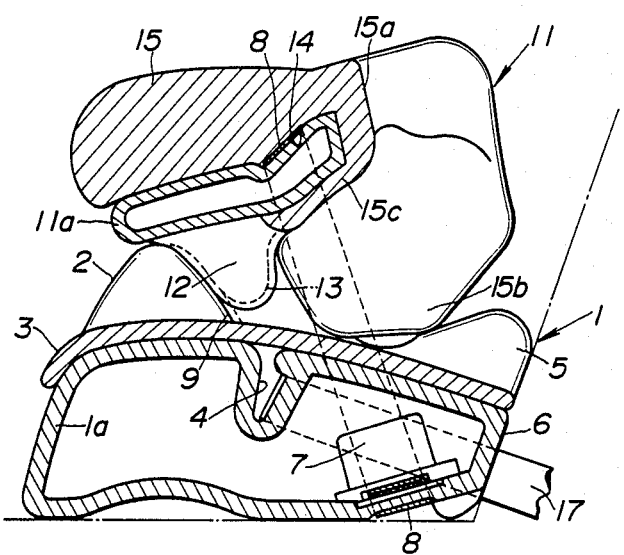
FIG. 5 is a sectional view taken along the line V—V of FIG. 3.

The seat section 1 includes an essentially rigid frame or body 1a having an approximately U-shaped front face and defining a longitudinally-extending recess for accommodating the lower half of the child 18. Both left-hand and right-hand sides of a front portion of the body 1a have respectively raised portions or upward projections 2 restricting the legs of the sitting child 18. Each of the upward projections 2 is provided with a curved finish. The rearwardly facing side of each upward projection 2 has a step 9. The surface of the body 1a defining the bottom surface of the recess is covered with a detachable cushioning member 3. An intermediate portion of the upper surface of the body 1a between the front edge and the rear edge of the body 1a is formed with a transversely-extending groove 4 for accommodating a vehicular accessory seat belt 17 of the two-point support type which is associated with and connected to the vehicular seat 16. As shown in FIG. 5, the cushioning member 3 extends above the groove 4 and thus conceals the groove 4. As shown in FIGS. 1 and 5, when the child seat arrangement is used, the seat section 1 is attached to the vehicular seat 16 by means of the accessory seat belt 17 extending in the groove 4. Both left-hand and right-hand sides of a rear portion of the body 1a have respectively raised portions or upward projections 5 restricting the waist of the sitting child 18. A major portion of each upward projection 5 is provided with a curved finish. The rear end face 6 of the body 1a inclines at an angle corresponding to the inclination of the seat back of the vehicular seat 16 so that the rear end face 6 can closely abut the seat back.

Figure 4:
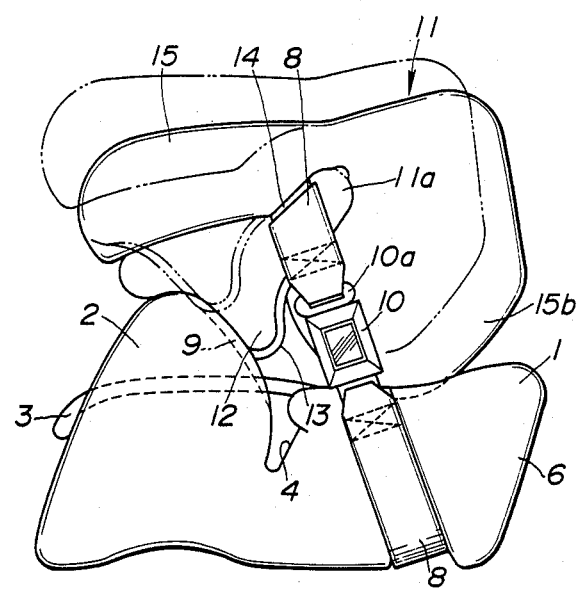
FIG. 4 is a side view of the child seat arrangement of FIG. 1.

The protective support 11 includes an essentially rigid frame or body 11a and a cushioning member 15 attached to the body 11a. The cushioning member 15 covers a major part of the body 11a. The rear of the cushioning member 15 has a curved recess 15a essentially conforming to the chest, the abdomen, and the thighs of the child 18. When the child seat arrangement is used, the body of the child 18 resides in the recess 15a and is gently or loosely held between the protective support 11 and the seat back of the vehicular seat 16. Both left-hand and right-hand sides of the cushioning member 15 have respectively hanging portions or downward projections 15b restricting the abdomen and the hip of the child 18. The protective support 11 has an inclined portion 15c restricting the thighs of the child 18. Both left-hand and right-hand sides of the body 11a have respectively hanging or downward projections 12 provided with a curved finish. The frontwardly facing sides of the downward projections 12 engage the rearwardly facing sides of the upward projections 2 of the seat section 1 respectively. Specifically, the frontwardly facing sides of the downward projections 12 essentially conform to or mate with the rearwardly facing sides of the upward projections 2. In addition, the frontwardly facing sides of the downward projections 12 have steps 13 engaging the steps 9 on the upward projections 2. The step 13 may extend throughout the edges of the downward projections 12. As shown in FIG. 4, the engagement between the steps 9 and 13 allows approximately vertical movement of the protective support 11 relative to the seat section 1. During this vertical movement of the protective support 11, the steps 13 on the protective support 11 slides along the steps 9 on the seat section 1, and the downward projections 12 of the protective support 11 are guided by the steps 9 on the seat section 1. An upper surface of the body 11a is formed with a transversely extending groove 14 for accommodating a belt 8 described hereinafter. The cushioning member 15 extends above the groove 14 and thus conceals the belt 8 in the groove 14. It is preferable that the cushioning member 16 separates from the belt 8 in the groove 14 to prevent from offering resistance to slide of the belt 8 along the groove 14.

The protective support 11 is bound to the seat section 1 by means of a retractable belt 8. As shown in FIG. 5, the seat section body 1a is hollow. A retractor 7 for reeling and holding a portion of the belt 8 is disposed in a rear part of an inner space of the body 1a. The retractor 7 is fixed to the body 1a. A portion of the belt 8 passes through the bottom wall of the body 1a and extends along the bottom surface of the body 1a, bending upwards and extending along one side of the seat section 1. The portion of the belt 8 enters the groove 14 and runs along the groove 14, extending out of the groove 14 to the other side of the seat section 1 and teminating at an end connected to a tongue 10a. One end of another portion of the belt 8 is fixed to the bottom surface of the body 1a. This portion of the belt 8 extends along the bottom surface of the body 1a and bends upwards, extending along the side of the seat section 1 and terminating at an end connected to a buckle 10 releasably engaging the tongue 10a. The buckle 10 and the tongue 10a can be handled at the side of the seat section 1 and the protective support 11.

During attachment or mounting of the child seat arrangement, the seat section 1 is placed on a vehicular seat 16, such as a vehicular rear seat, or a vehicular assistant driver's seat 16. The vehicular accessory seat belt 17 is passed through the groove 4 in the seat section 1 is fixed in place with respect to the vehicular seat 16 by the belt 17. When the seat section 1 is in this normal position, the rear end face 6 of the seat section 1 closely contacts the seat back of the vehicular seat 16 as shown in FIG. 5. This close contact stably holds the seat section 1 in the normal position. Then, a child 18 is sat on the seat section 1, and the protective support 11 is put on the seat section 1. As a result, the thighs and legs of the child 18 are placed between the seat section 1 and the proective support 11, and the chest and the abdomen of the child 18 are placed between the seat back of the vehicular seat 16 and the protective support 11. After the steps 13 on the downward projections 12 of the protective support 11 are adjusted into normal engagement with the steps 9 on the upward projections 2 of the seat section 1, the buckle 10 and the tongue 10a are engaged and the belt 8 is fastened. In this way, the protective support 11 is moved to and held in place relative to the seat section 1 by the belt 8. When the proective support 11 is in this normal position, the chest and the abdomen of the child 18 are restricted or gently held between the protective support 11 and the seat back of the vehicular seat 16, and the thighs and the legs of the child 18 is restricted or gently held between the protective support 11 and the seat section 1. In this case, the retractor-equipped belt 8 allows a slight vertical movement of the protective support 11, thereby preventing the child 18 from feeling cramped or lessening the cramped feeling. In addition, when the protective support 11 is in the normal position, the frontwardly facing sides of the downward projections 12 of the protective support 11 engage the rearwardly facing sides of the upward projections 2 of the seat section 1 via the steps 9 and 13. The engagement between the frontwardly facing sides of the downward projections 12 and the rearwardly facing sides of the upward projections 2 prevents or checks horizontally frontward movement of the protective support 11 relative to the seat section 1. Furthermore, the engagement between the steps 9 and 13 prevents or checks transverse movement of the protective support 11 relative to the seat section 1.

The vertical position of the protective support 11 relative to the seat section 1 can be adjusted in accordance with the height of the thighs of the child 18. The extractable belt 8 allows the upward movement of the protective support 11.

Upon vehicle collision or crash, the chest, the abdomen, and the thighs of the child 17 move frontwards while pressing the protective support 11. In this case, the protective support 11 serves as an impact shield absorbing shocks and protecting the chest, the abdomen, and the thighs of the child 18. An upper part of the protective support 11 can protect the head of the child 18.

During removal of the child 18 from the child seat arrangement, the buckle 10 and the tongue 10a of the belt 8 are disengaged and separated. Then, the protective support 11 is rotated from the normal or active position toward the side of the seat section 1 so that the child 18 is released. Finally, the child 18 is removed from the child seat arrangement.

Figure 6:
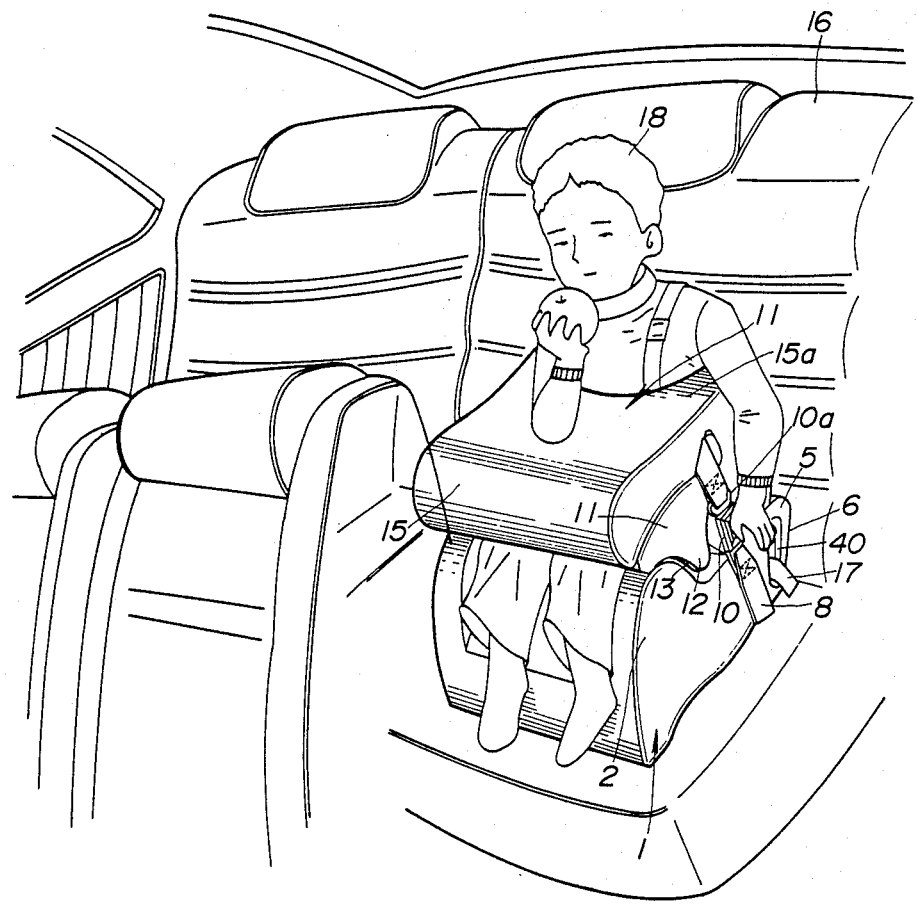
FIG. 6 is a perspective view of a child seat arrangement according to another embodiment of this invention.

FIG. 6 shows a second embodiment of this invention, which is similar to the embodiment of FIGS. 1-5 except for the design change as follows. The rear end of the seat section 1 has an opening or openings 40 through which the vehicular accessory seat belt 17 extends. The groove 4 (see FIG. 1) is omitted from the seat section 1. As in the embodiment of FIGS. 1-5, the seat belt 17 binds the seat section 1 to the vehicular seat 16.

As understood from the previous description, in the embodiments of this invention, the total area of the surfaces of the child in contact with the support segments of the child seat arrangement is large so that a support force is dispersed. Furthermore, the child seat arrangement has a small size, a light weight, and a simple structure and is thus suitable for use in small vehicles.

What is claimed is:

1. A child seat apparatus for a vehicle, the vehicle having a vehicular seat, seat back, and a seat belt associated with the vehicular seat, the child seat apparatus comprising:
   (a) a seat section, substantially in a block shape so as to fit on a vehicular seat and on a vehicular seat back, having a transverse opening through which a vehicular seat belt can be extended so as to fasten the seat section to the vehicular seat and vehicular seat back;
   (b) a protective support substantially in a block shape, detachably placed on the seat section, releasably bound to the seat section, and being adjustable in height relative to the seat section, the protective support having a first body so as to fit to the child's body, a cushioning member covering at least part of the first body, and an elongated opening through which a support belt is extended so as to bind the protective support to the seat section;
   (c) a belt device, having a support belt, a combination buckle and tongue interposed in the belt, and a retractor retracting the belt, for binding the protective support to the seat section and capable of rotating the protective support with one end of the protective support as a center so as to release the protective support from the seat section, both sides of the seat section having upward projections respectively, the seat section having an inner space accommodating the retractor, both sides of the protective support having downward projections disengagably engaging the upward projections of the seat section respectively, the engagement between the projections limiting horizontally frontward movement of the protective support relative to the seat section.

2. The child seat apparatus as set forth in claim 1, wherein the elongated opening of the protective support is a groove transversely extending along the protective support and has a cross section accommodating the width of the support belt.

3. The child seat apparatus as set forth in claim 1, wherein the downward projections have steps and the upward projections have steps engaging the steps of the downward projections, and the engagement between the steps limits transverse movement of the protective support relative to the seat section.

4. The child seat apparatus as set forth in claim 1, wherein the seat section and protective support define a space so as to accommodate thighs and legs of the child.

5. The child seat apparatus as set forth in claim 3 wherein the downward and upward projections have a curved finish.

6. The child seat apparatis as set forth in claim 4 wherein the seat section includes rear portion upward projections.

7. The child seat apparatus as set forth in claim 4 wherein the protective support cushioning member includes downward projections and inclined portions restricting child movement.

* * * * *